July 5, 1966   J. C. HAMILTON   3,259,325
METHOD AND MECHANISM FOR HANDLING GRANULAR MATERIALS
Filed Aug. 26, 1964   2 Sheets-Sheet 1
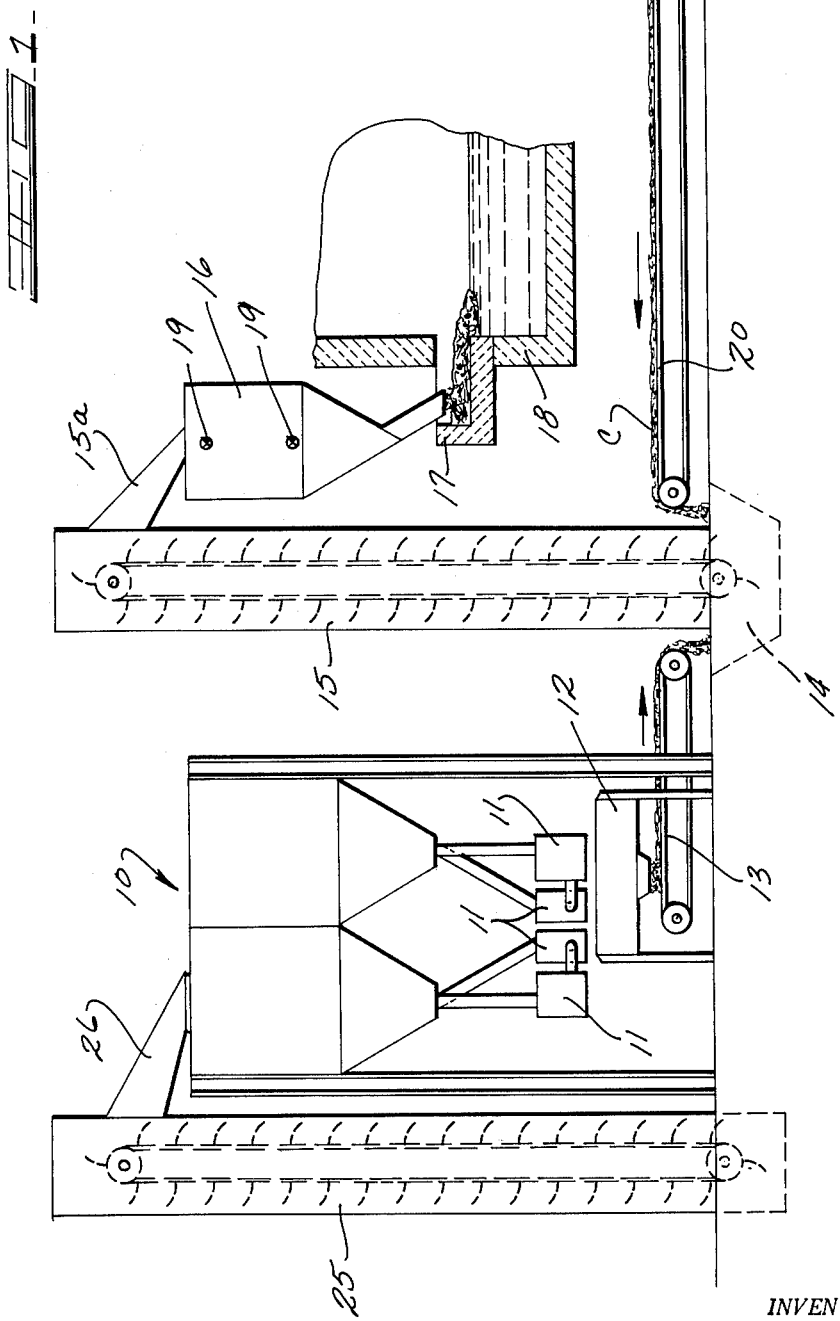
INVENTOR.
JOSEPH C. HAMILTON
BY J. R. NELSON &
W. A. SCHAICH
ATTORNEYS July 5, 1966 J. C. HAMILTON 3,259,325
METHOD AND MECHANISM FOR HANDLING GRANULAR MATERIALS
Filed Aug. 26, 1964 2 Sheets-Sheet 2
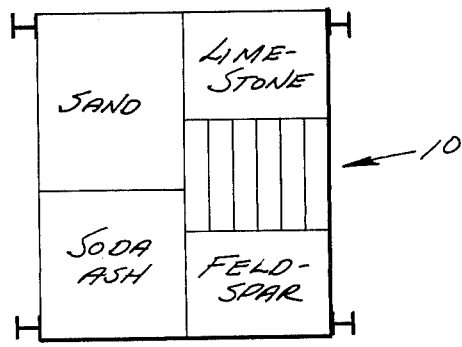
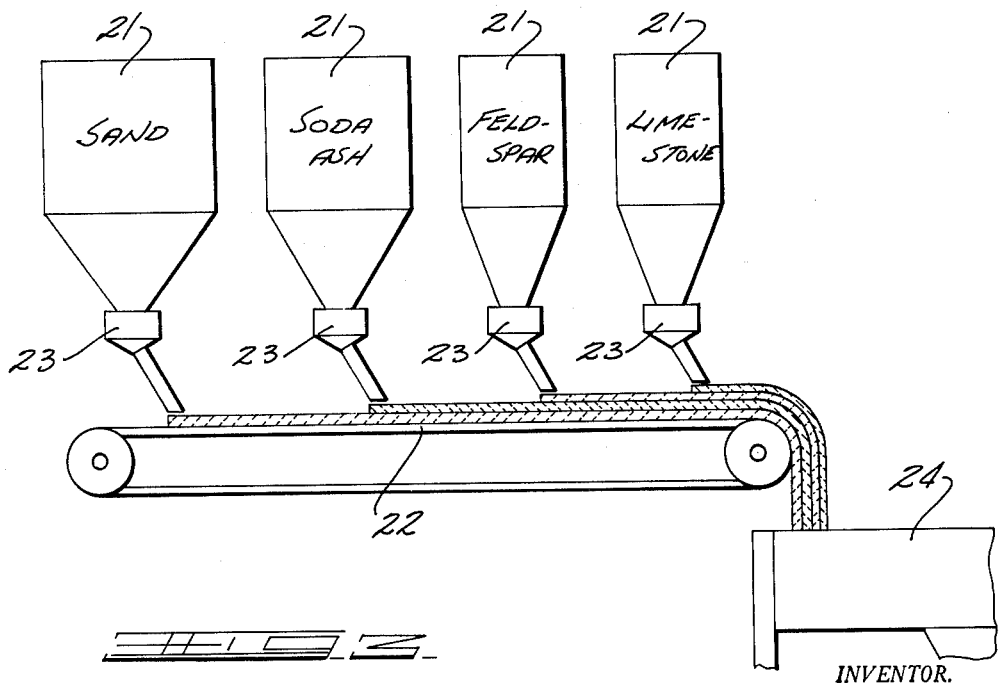
INVENTOR.
JOSEPH C. HAMILTON
BY J. R. NELSON &
W. A. SCHAICH

3,259,325
METHOD AND MECHANISM FOR HANDLING GRANULAR MATERIALS
Joseph C. Hamilton, Toledo, Ohio, assignor to Owens-Illinois Glass Company, a corporation of Ohio
Filed Aug. 26, 1964, Ser. No. 392,208
5 Claims. (Cl. 214—18)

My invention is a novel method of and mechanism for handling raw glass producing materials for delivery to a glass melting furnace.

In recent years there has been a pronounced trend toward the adoption of automatic "batch" weighing, handling, and distribution systems. Such customarily involves weighing the individual batch components, and delivering these components to a common mixer in which they are mixed to produce a single batch. By means of individual buckets, or perhaps suitable belt conveyors, the pre-mixed batch is delivered to bins for storage near the glass melting furnace, to which measured portions are fed from time to time. Interlocking control of such weighing, mixing and delivery, as might be expected, becomes exceedingly complicated and necessitates the use of costly mechanism. The total capacity of an automatic system of the above character, in terms of tons of batch handled per hour, and depending therefore upon the amount of storage required, may be so costly as to be prohibitive, especially where the plant is equipped, for example, with only one furnace and perhaps one or two glass forming machines. The cost may well be upwards of one-half million dollars.

An important object of my invention is the provision of a novel method and apparatus wherein the several raw materials required are proportioned volumetrically rather than gravimetrically and wherein the equipment is relatively simple and inexpensive and is operated continuously as compared with the "batch" operation, all to the end that an overall economical handling system is available.

It is also an object of my invention to provide a method, the utilization or practicing of which permits the use of comparatively simple mechanisms, which is portable and with relatively minor effort could be moved from location to location, as circumstances might dictate.

A further object of my invention is the provision of a raw materials handling method of the above character, wherein at any time during continuous measuring, mixing and feeding of the mixed components to the furnace, all phases of the operation may be concurrently interrupted or temporarily halted in response to activation of a control device associated with a hopper from which the mixed raw materials flow directly to the furnace.

It is also an object of my invention to provide a method of the above character, wherein "cullet" from the glass "forming" department of a plant would be delivered and added to the already mixed raw materials, with the delivery rate such that little or no cullet "storage" would be required.

Other objects will be in part apparent and in part pointed out hereinafter.

In the accompanying drawings forming a part of my application:

FIG. 1 is a side elevational view, partly in section, illustrating my invention.

FIG. 2 is a top plan view of a suitable arrangement of raw materials receptacles, or bins.

FIG. 3 is a fragmentary side elevational view showing another practical positioning of the raw materials bins above a belt conveyor which delivers such materials to the continuous mixer shown.

According to the method comprising my invention, each of the several components utilized in a composition for a typical glass, initially is placed in a compartmented storage bin 10 from which the component enters a volumetric proportioning unit 11. This unit delivers the component continuously, but at a controllable variable rate, to a continuous mixer 12, which may be of the conventional turbine type, such as the well known Eirich mixer. The several components, following adequate mixing, are discharged as a continuous stream onto a horizontal belt conveyor 13 which transfers the mix to a pit, or basin 14. A vertical elevator 15 continuously transfers the mix from the pit to an inclined chute 15$^a$ which has its discharge end positioned above a minimum size storage hopper 16 adjacent and above the feeder 17 or "dog-house" of the furnace 18. This hopper 16 incorporates suitable indicating devices 19 which function to start and stop the entire handling mechanism. Thus, if the hopper 16 is full, or nearly so, the upper device 19 functions to stop operation of the entire mechanism. On the other hand, if the hopper is nearly empty, the lower indicating device 19 will, through conventional means (not shown) start the mechanism so that there is a continuous flow of raw materials throughout the system. By suitable means (not shown) the volumetric proportioning units 11 and the indicating devices 19 are interconnected and so calibrated as to insure delivery of the proper volume of each raw materials component continuously to the mixer 12. Suitable conventional couplings (not shown) between the feeder, mixer, conveyor, and elevator may well constitute the control. Also, through the simple conventional expedient of varying the operating speed of the proportioning units 19, it is possible to effect required adjustment to compensate for variations in moisture content, grain size, etc. in the materials being handled. These proportioning units 11, incidentally, are provided with any conventional vibrating device (not shown). Such devices are obtainable in the open market. Their function, of course, is to insure continuous flow of the granular materials through the proportioning units 11.

Cullet C may well be conveyed from the forming department of the glass plant to the pit 14, by means of a suitably cooled belt conveyor 20, for delivery to the hopper 16, along with the various, previously mixed components which are deposited in the pit by the belt conveyor 13. The quantity of cullet delivered to the pit 14, would, of course, be the amount required in the mix being fed to the furnace by way of the hopper 16 and, as a consequence, little or no storage of cullet would be needed.

Thus, it is understood that the various raw materials would be delivered to the compartmented storage bin 10, perhaps in large part directly from railroad cars, by means of an elevator 25 having a discharge spout 26 capable of being positioned over any of the several compartments. With maintenance of adequate quantities of the several needed components in these compartments, such materials may flow continuously to the proportioning units 11 and thence to the mixer 12. From this mixer the materials are deposited by gravity upon the belt conveyor 13 which delivers the mix to the pit 14. The vertical elevator then transfers the mix, with or without added cullet, from the belt conveyor 20, to the hopper 16. As explained heretofore, this is a continuous operation wherein all of the units are either idle, or working, so that the flow of raw materials is continuous throughout the entire system, with no interruption in the functioning of any individual unit except as the whole system may be shut down, as operating conditions at the furnace and forming machine end, may require. Thus, all of the units are either functioning, or all are idle, at any given time.

In FIG. 3, I have illustrated another form of part of my invention. Here the several compartments of the storage bin 10, become a series of hoppers 21 arranged in a row over a horizontal belt conveyor 22. Each of the hoppers delivers a component of the raw materials mix to a proportioning unit 23 which is, or may well be, one of the units 11, described heretofore. By reason of the spacing of the hoppers along the conveyor 22, the several materials will be deposited and arranged more or less as superposed layers upon the conveyor 22. This conveyor then deposits the several components in the mixer 24, such being similar to the previously described mixer 12. The succeeding steps are those described heretofore.

As explained hereofore, with a simple relatively compact mechanism of the character described, it is particularly well adapted for efficient use in small scale operations, or perhaps as a supplement to existing "batch" systems for the purpose of improving the mixing capacity of the "batch" plants. Thus, for example, instead of immediately feeding the mixed components to the furnace, such may be stored for delivery to a conventional batch feeding system.

Modifications may be resorted to within the siprit and scope of the appended claims.

I claim:

1. The method of handling raw materials for delivery to a glass melting furnace which consists in maintaining a supply of each material required, flowing each material to a proportioning unit, transferring each of the several materials by gravity stream flow to a mixer, transferring mixed materials from the mixer to a hopper and thence by gravity flow directly to a furnace feeder opening into the melting end of the furnace.

2. The method of handling raw materials in preparing a mixture for delivery to a glass melting furnace, which consists in continuously delivering at a controllable rate and in individual stream form a plurality of components, bringing the components together and thoroughly mixing same, delivering the mixture to a dispensing point and thence by gravity flow directly into the melting end of the furnace.

3. In mechanism for handling raw materials in the preparation of a mixture for delivery to a glass melting furnace, means providing an individual source of supply of each component required, a proportioning unit individual to each component and to which a continuous stream flows from said source of supply, a turbine-type mixer to which all of the components flow from the proportioning units, a hopper, means for transferring the mixed materials to said hopper, and feeding means through which the mixed materials are transferred from the hopper to the melting end of the furnace.

4. In mechanism as defined in claim 3, an elevator for delivering the mixed materials to said hopper, and means for continuously delivering cullet to the elevator for admixture with said mixed materials.

5. In the method of handling raw materials for ultimate delivery to a glass melting furnace, the steps of causing gravity flow of each material to a proportioning unit, transferring each of the several materials by gravity stream flow to a mixer and transferring mixed materials from the mixer to a receptacle and by gravity flow directly into the melting end of the furnace.

References Cited by the Examiner

UNITED STATES PATENTS

| | | |
|---|---|---|
| 826,139 | 7/1906 | Brookfield. |
| 1,149,451 | 8/1915 | Kann. |
| 2,114,545 | 4/1938 | Slayter. |
| 2,638,258 | 5/1953 | Alvord _____ 214—17.62 X |
| 2,970,532 | 2/1961 | Skelton _____ 259—154 X |

FOREIGN PATENTS 96,210     3/1924     Austria.

GERALD A. FORLENZA, Primary Examiner.

R. G. SHERIDAN, Assistant Examiner.